Patented July 28, 1953

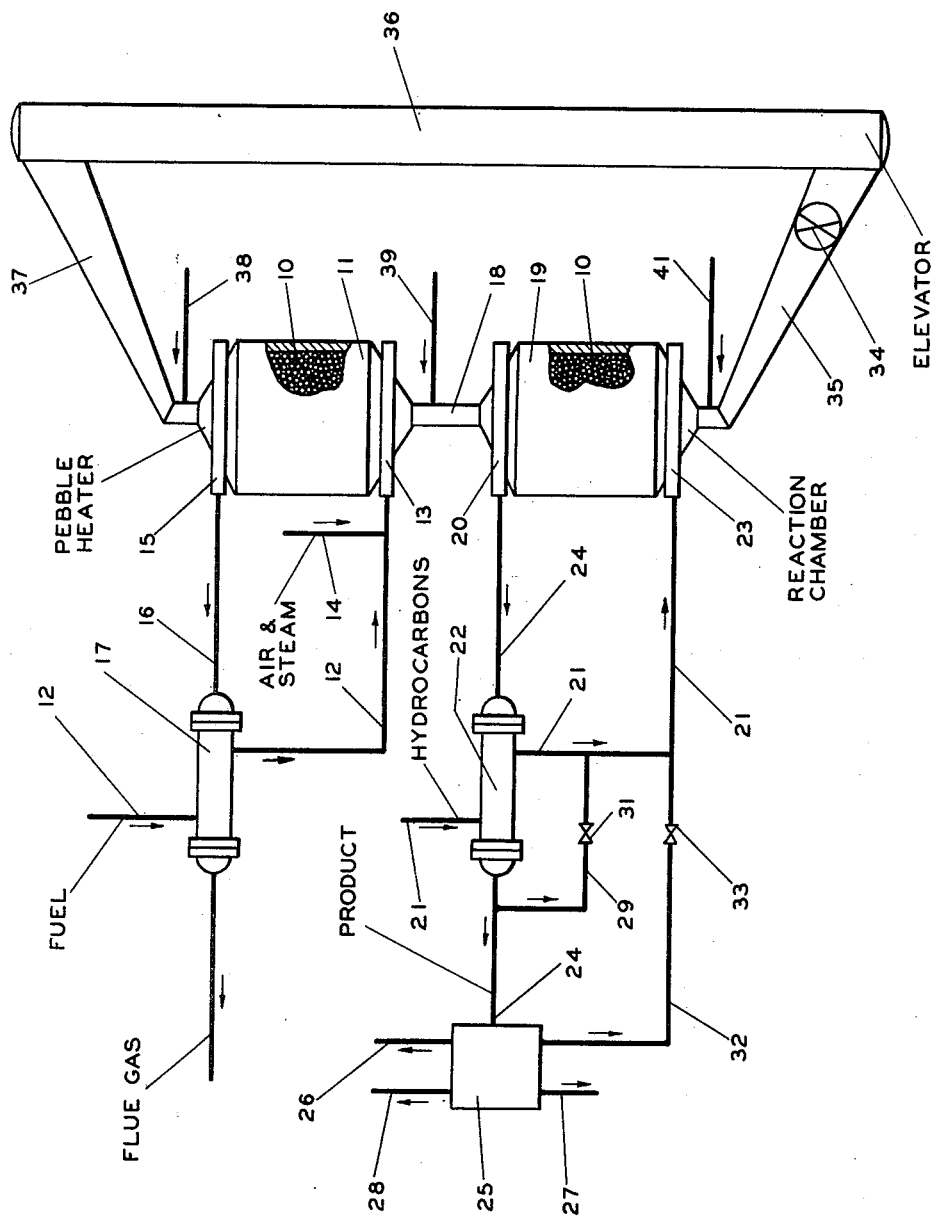

2,647,041

UNITED STATES PATENT OFFICE 2,647,041

PRODUCTION OF HYDROGEN FROM HYDROCARBONS

Sam P. Robinson, Bartlesville, Okla., assignor to Phillips Petroleum Company, a corporation of Delaware Application April 15, 1946, Serial No. 662,149

15 Claims. (Cl. 23—212)

This invention pertains to the production of hydrogen by cracking of hydrocarbons at elevated temperatures. In a specific embodiment the invention relates to a process for cracking hydrocarbons to produce hydrogen utilizing metallic pebbles as combined catalyst and heat exchange material for the reaction.

Cracking of hydrocarbons such as natural gas and vaporized heavier hydrocarbons is commonly effected by heating these gases to high temperatures either with or without the aid of catalysts. Since the cracking process is endothermic in nature, both the sensible heat and heat of reaction must be supplied to the gas being cracked. An effective method of cracking is afforded by pebble heater type operation which entails supplying all of the heat requirements in the cracking zone by means of a stream of hot refractory pebbles, the pebbles having been heated, usually, by fuel gas combustion in a separate heating zone. It is of course desirable to utilize a pebble which is highly refractory, is strongly catalytic, and which does not lose its catalytic activity under the normally severe conditions existing in the pebble heater, itself.

It is an object of this invention to provide a process for cracking hydrocarbons to produce hydrogen which effectively utilizes a moving-type combination catalyst and heat-exchange material.

It is also an object of the invention to provide a process for producing hydrogen and carbon as a by-product, using the pebble heater method, in which catalytic activity is not seriously diminished during the heating of the pebbles.

A further object of the invention is to provide a method of heating metallic pebbles in pebble heater-type processes without substantial oxidation, and deterioration of the pebbles.

Other objects of the invention will become apparent from the accompanying description.

Conventional pebble heater apparatus provides a pebble heating chamber positioned above a reaction chamber with a connecting neck between the two chambers for gravity flow of pebbles from the upper to the lower chamber. Pebbles of ceramic, metal, or other refractory material are heated by direct contact with hot combustion gas as they flow thru the pebble heater. They then pass thru the neck between the chambers and into the reaction chamber where they give up heat to the reactant gases which are usually passed therethru in countercurrent flow to the downwardly flowing pebbles. On emerging from the reactor, the pebbles are considerably cooler than reaction temperature, so they are transferred by elevator to a level above the inlet to the pebble heater and are permitted to flow back into the heater for reheating and continuance of the operation cycle.

The term "pebble" as used herein refers to a refractory material in flowable form and size, which will flow readily by gravity thru the chambers of a pebble heater-type apparatus. Pebbles are preferably substantially spherical and vary in size from about $\frac{1}{8}''$ to $1''$ in diameter with the preferred size about $\frac{1}{4}''$ to $\frac{1}{2}''$.

The present invention utilizes metallic pebbles selected for their relatively high catalytic activity and provides pebble heating techniques which prevent substantial oxidation at high temperatures. It is found that when utilizing iron, nickel, Inconel, and Monel pebbles, heating conditions can be established in the heater which permit the required rapid, high temperature heating of the pebbles by direct contact with combustion gas without the usual oxidation of the metal and consequent impairment of its catalytic activity and high erosion thereof from circulation thru the system. These metals are strongly catalytic in effecting complete cracking of hydrocarbons and are very desirable in the process of the invention for this reason.

Inconel, the preferred metallic material for use in the process of the invention, has the following composition by weight: nickel, not less than 70%; chromium, 11–15%; manganese, not over 1%; iron, not over 10%; silicon, not over 0.5%; carbon, not over 0.15%. The conventional composition is 80% nickel, 15% chromium, and 5% iron.

Monel, an excellent alloy for the process, has the following composition by weight: nickel, 63–70%; manganese, not over 2%; iron, not over 2.5%; silicon, not over 0.5%; carbon, not over 0.5%; aluminum, not over 0.5%; copper, balance. A conventional composition of Monel is nickel, 67%; copper, 30%; manganese, 1%; iron, 1.4%; silicon, 0.1%; carbon, 0.15%.

Both nickel and iron pebbles also function effectively in the process of the invention. Where economy of metal is desired, iron or steel balls may be coated heavily with nickel, Inconel, or Monel. It is also feasible to form hollow balls from these metals and utilize them as pebbles, care being taken to make them strong enough to withstand the pressures involved and heavy enough to avoid entrainment in the gases contacted.

While the invention is widely applicable to catalytic cracking of hydrocarbons to produce hydrogen and carbon, it has useful application in prevention of oxidation of metallic pebbles in relatively non-catalytic chemical processes, also.

Hydrogen may be manufactured according to the invention from a variety of hydrocarbons including paraffinic, olefinic, aromatic, and naphthenic hydrocarbons; but natural gas is the preferred feed material.

In accordance with the invention, a suitable hydrocarbon feed such as natural gas, which is preferably preheated, is fed into the reaction chamber of a pebble heater in countercurrent relation to a downwardly flowing stream of hot Inconel pebbles. The pebbles must be sufficiently hot to maintain a cracking temperature of between about 1300° and 2000° F. To maintain these cracking temperatures under the very short reaction times which may be used, requires pebble temperatures of from about 1500° to 2400° F., pebble temperature varying with reaction time and pebble flow rate. Reaction times of about 0.05 to 0.2 second are sufficient when operating at the above temperatures and with the metallic pebbles disclosed herein. The pebbles emerging from the reactor are considerably cooled, varying in temperature from about 500° to 1000° F. and are transferred by elevator to a point above the pebble heating chamber from which they flow by gravity into said chamber. The elevator may be of the bucket, screw, or gas lift type, however, a bucket elevator offers more efficient operation in the process than either of the other types and is preferred.

Pebbles entering the heating chamber are contacted with a stream of hot combustion gas produced in a burning chamber adjacent the heater. In order to prevent oxidation of the metallic pebbles at the high temperatures involved (temperatures up to about 2800° F.), the invention provides for maintaining a mildly reducing atmosphere in the pebble heating chamber. In cases where there is a small accumulation of carbon on the pebbles from deposition in the reaction zone, this reducing action can be obtained by passing a small quantity of steam into the heating chamber along with the heating gas. This steam addition effects the water gas reaction with the hot carbon on the pebbles to produce $H_2$ and $CO$ and maintain reducing conditions when little or no surplus oxygen is present in the combustion gas.

When the feed and operating conditions in the reaction zone are not conducive to the deposition of carbon on the metallic pebbles, a sufficiently reducing effect is obtained within the heating zone by carefully regulating the proportion of oxygen to fuel burned to produce heating gas so that there is a slight deficiency in oxygen in relation to the amount required for complete combustion of the fuel to $CO_2$ and $H_2O$. The proportion of supplied oxygen to the oxygen required for complete combustion should of course be relatively close to unity in order to economize on fuel. In many areas the cost of natural gas is so low that economy of fuel is secondary to assurance of a reducing atmosphere and no great care need be exercised in obtaining the utmost heat from the fuel. In some cases it is desirable to utilize a portion of the effluents from the reaction chamber to supplement the fuel burned to generate combustion gas for heating the pebbles since this expedient aids in maintaining reducing conditions in the heater. The addition of a relatively small amount of steam even when there is no carbon deposited on the pebbles appears to aid in avoiding any slight oxidation of the pebbles. It is important to avoid introducing more oxygen than is stoichiometrically required to completely oxidize all of the C and H in the heating zone either when adding steam to the fuel or when no steam is added.

Economy of operation and higher efficiency are obtained in the process of the invention by utilizing heat exchange between the flue gas from the heating chamber and the fuel fed thereto, as well as between the effluents from the reaction chamber and the feed thereto. The use of small-tube, high-velocity heat exchangers prevents carbon deposition in the exchangers.

In order to present a more complete description of the invention reference is made to the drawing which is a diagrammatic illustration of one arrangement of apparatus for performing the invention. In operation heat is supplied for the process by heating pebbles 10 in heater 11. Any desirable hydrocarbon fuel from line 12 is burned in bustle ring or burner 13, with the aid of air admitted thru line 14. Steam may be mixed with the fuel or air as desired to effect the removal of any residual carbon on the pebbles and to help in preventing pebble oxidation. The air or oxygen input is closely regulated to assure incomplete combustion of the fuel admitted thru line 12. Hot combustion gas of a reducing nature passes thru heater 11, raising the temperature of the pebbles to the desired degree, and passes on via bustle ring 15, line 16, and heat-exchanger 17 out of the system to any desired point of use or disposal. Fuel in line 12 is preheated in exchanger 17. Hot pebbles continuously pass into neck 18 and reaction chamber 19 from heater 11. These hot, fluent, metallic pebbles are contacted in reactor 19 by the preheated gaseous hydrocarbons to be cracked which are admitted thru line 21, heat-exchanger 22 and bustle ring 23. In passing thru reactor 19 the hydrocarbon gases are heated to cracking temperatures and thru the catalytic action of the metallic pebbles are rapidly cracked to hydrogen and carbon, most of the latter being entrained in the effluent gases which pass via bustle ring 20, line 24, and heat-exchanger 22 to product separation means 25. Means 25 separates the various constituents such as hydrogen, which is removed thru line 26, carbon thru line 27, and residual constituents thru line 28. When desired, effluents from the reaction may be recycled thru line 29 and valve 31 to feed line 21. It is also feasible to recycle any residual hydrocarbons from separation means 25 via line 32 controlled by valve 33 to feed line 21.

Flow of pebbles thru heater 11 and reactor 19 is regulated by feeder 34 in conduit 35 in such manner as required to properly heat the pebbles in heater 11 and the gases in reactor 19. In this manner of operation, the system is full of pebbles from the upper portion of heater 11 to the pebble feeder 34 so as to maintain a compact mass or stream of pebbles 10 in the chambers and connecting throat. This facilitates the avoidance of mixing combustion gas with hydrocarbon gases from reactor 19 by way of throat 18. Feeder 34 and conduit 35 pass pebbles into elevator 36 which elevates them and discharges them into conduit 37 for gravity flow back into heater 11 where they are reheated and again passed to the reaction chamber to effect a continuous process.

It is preferred to operate at pressures only slightly above atmospheric such as 3 pounds per square inch gage or less, but other pressures within reasonable limits may be used. Maintaining substantially equal pressures in the heater and the reactor at all times tends to eliminate flow of gases from chamber to chamber. When required, steam may be admitted thru lines 36, 39, and 41 to block the flow of gases thru conduits 37, 18, and 35, respectively.

When operating with natural gas as feed and as fuel, and with ¼" Inconel pebbles, under the following conditions a recovery of approximately 92% of the feed hydrogen is effected with no observable oxidation of the pebbles.

| | |
|---|---|
| Cracking temperature °F | 1850 |
| Pebble temperature entering reactor °F | 2200 |
| Pebble temperature leaving reactor °F | 1100 |
| Feed temperature (preheat) °F | 950 |
| Pressure of effluent product gas (lbs. gauge) | 1.5 |
| Reaction time in seconds | 0.08 |
| Pebble temperature entering heater °F | 1050 |
| Gas temperature in heater °F | 2500 |
| Fuel temperature (preheat) °F | 800 |
| Mole ratio of fuel to steam | 1/0.2 |
| Mole ratio of oxygen to fuel | 1.9/1 |
| Pressure of effluent flue gas (lbs. gauge) | 1.5 |

Numerous advantages accrue from operation according to the invention. The use of highly catalytic metallic pebbles without concomitant oxidation thereof permits the use of very short reaction times at not unusually high temperatures. The metallic pebbles disclosed are indestructible and have an indefinite catalytic and heat exchange life and effect a considerable economy over ceramic pebbles over an extended period. Avoidance of oxidation of the pebbles not only materially extends their life but also assists in maintaining high production rate in the process. By preheating the feed and the fuel to relatively high temperatures, utilizing sensible heat of the effluents from the reaction and heating zones, much lower pebble temperatures and heating zone temperatures are feasible. This preheating of fuel and feed also permits closer temperature control in both chambers and contributes to efficiency of operation.

The various modifications described provide for rather flexible operation to meet the varied conditions required in different processes. It will be understood that certain features and sub-combinations may be desirable although not specifically described. This is contemplated by and is within the scope of the claims. It is also obvious that certain changes in details within the scope of the claims may be made without departing from the spirit of this invention. It is therefore to be understood that my invention is not to be unduly or unnecessarily limited to the specific details described and shown.

I claim:

1. A continuous process for producing hydrogen which comprises continuously passing a hydrocarbon gas thru a reaction zone in contact with a compact countercurrent stream of hot pebbles essentially constituted of at least one metallic material of the class consisting of iron, nickel, chromium, and copper and at such a temperature that said gas is substantially cracked to hydrogen and carbon, transferring said pebbles from said reaction zone to a heating zone, reheating said pebbles to above cracking temperature by contacting them in said heating zone with a countercurrent stream of water gas and hot blue gas devoid of free oxygen, whereby substantial oxidation of said pebbles is avoided, transferring said pebbles to said reaction zone to complete a cycle of operation, and recovering the hydrogen produced.

2. Process of claim 1 in which the cracking time is between about .05 and 0.2 second.

3. Process of claim 1 in which the cracking temperature is between about 1300° and 2000° F.

4. Process of claim 1 in which the pebbles are constituted of nickel.

5. Process of claim 1 in which the pebbles are constituted of nickel-chromium-iron.

6. Process of claim 1 in which the pebbles are constituted of nickel-copper.

7. A continuous process for producing hydrogen which comprises continuously passing natural gas thru a reaction zone in contact with a compact stream of hot Inconel pebbles at such a temperature that said gas is heated to a temperature of between about 1300° and 2000° F. and substantially cracked to hydrogen and carbon thereby depositing carbon on said pebbles, withdrawing said pebbles from said reaction zone and transferring them to a pebble heating zone, introducing to said pebble heating zone a stream of hot blue gas devoid of free oxygen and steam proportioned so as to remove substantially all of said carbon from said pebbles and maintain a mildly reducing effect on said pebbles while heating them to a temperature of between about 1500° and 2400° F., returning said pebbles to said reaction zone to complete the cycle, and recovering the desired products.

8. In a catalytic chemical conversion process wherein heat required for the conversion is supplied to a reaction zone by circulating a compact stream of hot metallic pebbles thru said reaction zone in contact with a stream of gas to be converted and said pebbles are then transferred to a heating zone and contacted with a heating gas comprising hot blue gas and again circulated thru said reaction zone, the step of controlling the character of the heating gas to maintain a reducing effect with respect to said metallic pebbles in said heating zone by utilizing a blue gas devoid of free oxygen and admixed with steam.

9. The process of claim 8 further characterized in that said reducing effect is maintained by only partial combustion of a fuel to produce an incompletely oxidized gas high in carbon monoxide content which is then used as said blue gas.

10. In a catalytic hydrocarbon conversion process wherein heat required for the conversion is supplied to a conversion zone by circulating a compact stream of hot catalytic metallic pebbles thru said conversion zone in contact with a stream of hydrocarbon gas to be converted under conditions effecting said conversion and depositing a substantial amount of carbon on said pebbles, and wherein said pebbles are then circulated thru a heating zone to be reheated and are then recirculated thru said conversion zone, the step which comprises supplying to said heating zone a stream of hot blue gas containing substantially no free oxygen and sufficient water vapor to react with said deposited carbon to form water gas whereby a reducing effect with respect to said metallic pebbles is maintained in said heating zone.

11. A continuous process for the catalytic conversion of hydrocarbons which comprises continuously gravitating a unitary, compact, fluent mass of ⅛" to 1" metallic pebbles constituted at least one member of the group consisting of iron, nickel, chromium, and copper, through a series of vertically extending zones comprising a pebble heating zone, a reaction zone positioned at a lower level than said heating zone, and a relatively narrow interconnecting zone; continuously contacting that section of said mass of pebbles flowing through said heating zone with a stream of hot blue gas free of uncombined oxygen and non-oxidizing with respect to said pebbles under the conditions in said heating zone so as to heat said pebbles to a temperature in the range of 1500° to 2400° F. without substantial oxidation thereof; continuously contacting that section of said mass of pebbles flowing through said reaction zone with a stream of gaseous hydrocarbon so as to effect the desired conversion thereof with concomitant cooling of the pebbles; maintaining substantially the same gas pressure in the heating and in the reaction zones; returning the cooled pebbles to said heating zone; and recovering an effluent from said reaction zone.

12. A continuous process for the catalytic conversion of hydrocarbons which comprises continuously gravitating a unitary, compact, fluent mass of 1/8" to 1" metallic pebbles through a series of vertically extending zones comprising a pebble heating zone, a reaction zone positioned at a lower level than said heating zone, and a relatively narrow interconnecting zone; continuously contacting that section of said mass of pebbles flowing through said heating zone with a stream of hot flue gas free of uncombined oxygen and non-oxidizing with respect to said pebbles under the conditions in said heating zone so as to heat said pebbles to a temperature in the range of 1500° to 2400° F. without substantial oxidation thereof; continuously contacting that section of said mass of pebbles flowing through said reaction zone with a stream of gaseous hydrocarbon so as to effect the desired conversion thereof with concomitant cooling of the pebbles; returning the cooled pebbles to said heating zone; and recovering an effluent from said reaction zone.

13. The process of claim 12 utilizing Inconel pebbles.

14. The process of claim 12 utilizing Monel pebbles.

15. The process of claim 12 utilizing iron pebbles.

SAM P. ROBINSON.

References Cited in the file of this patent

UNITED STATES PATENTS

| Number | Name | Date |
|---|---|---|
| 2,367,928 | Clark | Jan. 23, 1945 |
| 2,389,636 | Ramseyer | Nov. 27, 1945 |
| 2,443,337 | Weber | June 15, 1948 |
| 2,471,104 | Gohr | May 24, 1949 |

OTHER REFERENCES

"Fuel Flue Gases," published by American Gas Association, 1940, page 159.

Mellor: "Comprehensive Treatise on Inorganic and Theoretical Chemistry," 1922, Longmans, Green and Co., New York, vol. I, page 280.